(12) United States Patent
Väänänen et al.

(10) Patent No.: US 7,409,003 B2
(45) Date of Patent: Aug. 5, 2008

(54) METHOD AND APPARATUS FOR IMPLEMENTING ADAPTIVE TOMLINSON-HARASHIMA PRECODING IN A DIGITAL DATA LINK

(75) Inventors: Jäïnë Väänänen, Espoo (FI); Heikki Laamanen, Espoo (FI)

(73) Assignee: Tellabs Oy, Espoo (FI)

( * ) Notice: Subject to any disclaimer, the term of this patent is extended or adjusted under 35 U.S.C. 154(b) by 387 days.

(21) Appl. No.: 10/503,076

(22) PCT Filed: Feb. 19, 2003

(86) PCT No.: PCT/FI03/00122

§ 371 (c)(1),
(2), (4) Date: Jul. 30, 2004

(87) PCT Pub. No.: WO03/071754

PCT Pub. Date: Aug. 28, 2003

(65) Prior Publication Data

US 2005/0129138 A1    Jun. 16, 2005

(30) Foreign Application Priority Data

Feb. 19, 2002 (FI) ................... 20020330

(51) Int. Cl.
H04B 15/00 (2006.01)
H04B 1/10 (2006.01)

(52) U.S. Cl. ...................... 375/285; 375/350
(58) Field of Classification Search .......... 375/295, 375/316, 232, 285, 259, 350
See application file for complete search history.

(56) References Cited

U.S. PATENT DOCUMENTS 5,353,310 A * 10/1994 Russell et al. ............... 375/348

(Continued)

FOREIGN PATENT DOCUMENTS

WO    WO-0150645 A1    7/2001

(Continued)

OTHER PUBLICATIONS

Meehan, J.P. et al., The 8th IEEE International Symposium on Personal, Indoor and Mobile Radio Communications, 1997. Waves of the Year 2000'. Sep. 1-4, 1997, vol. 3, pp. 1140-1144.

(Continued)

*Primary Examiner*—Don N Vo
(74) *Attorney, Agent, or Firm*—Birch, Stewart, Kolasch & Birch, LLP

(57) ABSTRACT

The invention relates to a method for implementing adaptive Tomlinson-Harashima precoding using a digital data communications link. According to the method, the outgoing bit stream is coded into symbols, channel distortion is corrected by precoding (TML) the symbols, the precoded symbols are sent over a data communications channel (2, CHN), in which case the symbols, which have passed through the channel (2, CHN) and signal processing means for the receiver are reconstructed to form a bit stream. According to the invention, updated precoder coefficient parameter values are formed with the aid of an error variable (e), which is dependent on the symbol decisions (S') of the receiver, the output signal of a decision-feedback equalizer, and a signal (Q) that is formed from the received signal by compensating the effect of the precoder transfer function of the received signal with an inverse precoder transfer functions.

8 Claims, 5 Drawing Sheets

U.S. PATENT DOCUMENTS

| | | | |
|---|---|---|---|
| 5,420,893 A * | 5/1995 | Ward | 375/368 |
| 5,878,086 A * | 3/1999 | Hulyalkar | 375/285 |
| 6,101,223 A | 8/2000 | Betts | |
| 6,134,265 A * | 10/2000 | Long | 375/222 |
| 6,314,135 B1 * | 11/2001 | Schneider et al. | 375/232 |
| 6,324,220 B1 * | 11/2001 | Sellars | 375/296 |
| 6,400,288 B1 * | 6/2002 | Fredrickson et al. | 341/59 |
| 6,400,761 B1 * | 6/2002 | Smee et al. | 375/232 |
| 6,697,423 B1 * | 2/2004 | Jin et al. | 375/233 |
| 6,993,067 B1 * | 1/2006 | Betts et al. | 375/214 |
| 7,133,465 B2 * | 11/2006 | McLaughlin | 375/296 |
| 2004/0071240 A1 * | 4/2004 | Betts | 375/346 |
| 2004/0194004 A1 * | 9/2004 | Betts | 714/792 |
| 2006/0291503 A1 * | 12/2006 | Chapman | 370/469 |

FOREIGN PATENT DOCUMENTS

WO    WO-0154368 A1    7/2001

OTHER PUBLICATIONS

Fischer, R. Electronics Letters, Mar. 2, 1995, vol. 31, No. 5 pp. 356-358.

* cited by examiner

US 7,409,003 B2

METHOD AND APPARATUS FOR IMPLEMENTING ADAPTIVE TOMLINSON-HARASHIMA PRECODING IN A DIGITAL DATA LINK

CROSS-REFERENCE TO RELATED APPLICATION

The present application claims priority under 35 U.S.C. §119 to Finnish Application No. 2002-0330, filed Feb. 19, 2002, and PCT Application No. PCT/FI03/00122 filed Feb. 19, 2002, the entire contents of which are hereby incorporated by reference.

BACKGROUND OF THE INVENTION

1. Field of the Invention

The present invention relates to a method for adaptive Tomlinson-Harashima precoding in a digital data communications link.

The invention also relates to an apparatus for adaptive Tomlinson-Harashima precoding in a digital data communications link and for a receiver.

2. Description of Background Art

FIG. 1 shows one solution according to the state of the art. When transmitting data in digital form, i.e. a bit stream, over a data communications channel 2, the bit stream in question is converted in the transmitter (TX) into an analog signal, which can travel in a transmission channel. The transmission channel can be, for example, a radio path, a copper cable, or an optical-fibre cable. In the receiver (RX), the transmitted bit stream is reconstructed as unchanged as possible, on the basis of the incoming analog signal. The reconstruction of the bit stream in the receiver is hampered by the transmission channel's distorting effect on the signal and by the noise accumulating in the signal. These phenomena lead to errors in some of the reconstructed bits (e.g., on average 1 bit in $10^7$ may be erroneous).

Equalizers, located in either the transmitter, or the receiver, or partly in both, are generally used to compensate the transmission channel's distorting effect on the signal. The equalizers can be either fixed or adaptive. The effect of noise is compensated with various coding techniques, such as Reed-Solomon coding, convolution coding, trellis coding, and turbo coding.

The most generally used method for equalizing channel distortion is an adaptive linear equalizer (FFE). However, on certain channels, using a linear equalizer alone is not enough. This situation arises, if transmission zeroes occur on the signal band, thus preventing certain frequencies from passing over the channel 2. A feedback equalizer is used to compensate the distortion caused by the transmission zeroes. Even in systems, in which the channel 2 does not contain transmission zeroes, the use of a feedback equalizer is often preferable, as it improves the noise tolerance of the system. A feedback equalizer located in the receiver is a decision-feedback equalizer (DFE) while one located in the transmitter is a Tomlinson-Harashima precoder (TML). The system can include both a DFE and a TML. A linear equalizer too can be located in either the transmitter, the receiver, or part in the transmitter and part in the receiver.

In the present publication, the following abbreviations are used in the descriptions of both the prior art and the invention:
CAP Carrierless amplitude and phase modulation
DFE Decision-feedback equalizer
FFE Feed forward equalizer
LMS Least mean square
PAM Pulse amplitude modulation
QAM Quadrature amplitude modulation
RX Receiver
TX Transmitter
TML Tomlinson-Harashima precoder In the following, a digital data communications link is examined in terms of channel distortion compensation. The line code used is either pulse amplitude modulation (PAM), quadrature amplitude modulation (QAM), or carrierless amplitude and phase modulation (CAP). FIG. 1 shows a model for a system according to the prior art, the receiver 3 of which has an adaptive linear equalizer (FFE) and an adaptive feedback equalizer (DFE) (Lee & Messerschmitt). The channel noise model (CHN) includes fixed filters and possible modulation mechanisms. The bit stream to be transmitted is coded into symbols (S), which are transmitted over the channel 2. In the receiver 3, the output of the channel 2 is processed by equalizers (FFE and DFE), after which symbol decisions (S') are made from the equalized signal. The symbol decisions (S') that are made are also referred to as symbols estimated by the receiver. Both adaptive equalizers are adapted to the characteristics of the channel 2 in training performed when a connection is established. In addition, in steady state transmission, the equalizers are also adjusted, to compensate possible variations in the channel 2. The equalizer are adapted and adjusted on the basis of the detection error (e).

FIG. 2 shows a second system according to the prior art (Lee & Messerschmitt). It has an adaptive linear equalizer (FFE) in the receiver 3 and a feedback equalizer (TML) in the transmitter 1. During training, this system too operates like that of FIG. 1, containing a linear equalizer and a decision-feedback equalizer (DFE). Once the training has ended, the values of the coefficient parameters of the decision-feedback equalizer are transmitted, over an auxiliary upstream channel, to the transmitter, where they form a Tomlinson-Harashima precoder (TML). In steady state transmission, the linear equalizer (FFE) is adjusted, but the feedback equalizer of the transmitter (TML) is fixed and is not adjusted.

Tomlinson-Harashima precoding has the advantage over a DFE that, unlike a DFE, precoding does not result in the feedback of the detection error. Particularly if the amplitude response of the channel 2 has a shape that causes large coefficient parameter values to appear in the DFE, feedback of erroneous decisions by the detector is a real problem. In the most serious cases, when using a DFE a single erroneous decision can lead to loss of connection.

Adjustment of the linear equalizer alone is generally sufficient to compensate for the effects of variation in the channel 2. In some cases, the channel 2 includes analog band-stop filters to eliminate, for example, radio interference. The positions of the transmission zeroes of analog band-stop filters may vary when the component values of the filters change with the temperature. Such variation in the characteristics of the channel 2 cannot be compensated by adjusting only the linear equalizer. Another drawback is that the system cannot adapt optimally to changed noise conditions, as the feedback equalizer is not adjusted in steady state transmission.

FIG. 3 shows a method according to the state of the art for solving the problem described above. The system includes a linear equalizer (FFE), a Tomlinson-Harashima precoder (TML), and a decision-feedback equalizer (DFE). Only the FFE and the DFE take part in the training. At the end of the training, the DFE's tap values are transferred to the transmitter, to form the precoder (TML) while the coefficient parameter values of the DFE are reset to zero. In steady state transmission, the FFE and the DFE are adjusted, but the precoder (TML) is not. The advantage of this is that channel and noise-state changes that cannot be handled by adjusting only the linear equalizer are no longer a problem, as the receiver's DFE too is adjusted during steady state transmission. The drawback is the error feedback because of the receiver's DFE. It can be assumed that the coefficient parameter values of the receiver's DFE will remain lower than in the situation according to FIG. 1, because part of the feedback equalization takes place already in the transmitter. Thus the error feedback is also weaker than in FIG. 1. However, the system performance depends essentially on the size of the changes in the characteristics of the channel 2 and in the noise state, compared to the training situation.

The system shown in FIG. 2 or 3 could be directly improved by calculating, in the receiver, the adjustment increments of the coefficient parameters, using the detection error and the symbol decisions, as if adjusting the DFE, but instead to transmit the calculated adjustment increments to the transmitter, over an auxiliary upstream transmission channel. The precoder's coefficient parameter values are updated using the said adjustment increments. The precoder would then also be adjusted in steady state transmission, making the receiver's DFE unnecessary, or allowing the increase in its coefficient parameter values to be limited. However, it can be shown that the adjustment method described above will not work in a general case.

A Tomlinson-Harashima precoder can be updated to correspond to the varying channel characteristics by repeating the following operations: 1) the coefficient parameter values of the feedback equalizer, corresponding to the changed state of the channel, are formed in the receiver, 2) the formed coefficient parameter values, or changes in the coefficient parameter values, are transferred to the Tomlinson-Harashima precoder using, for example, an auxiliary upstream transmission channel.

SUMMARY AND OBJECTS OF THE INVENTION

The present invention is intended to provide an improved method and apparatus, by means of which coefficient parameter values, corresponding to the changed state of the channel, can be formed for a Tomlinson-Harashima precoder.

According to the invention, the coefficient parameter values (or changes in the coefficient parameter values) corresponding to the changed state of the channel are formed in the receiver as follows:

The effect of the transfer function of the precoder is removed from the received signal by means of a system that forms an inverse precoder transfer function.

Coefficient parameter values corresponding to the changed state of the channel are formed on the basis of the signal passing the inverse precoder function.

Because the signal passing the inverse precoder transfer function corresponds, in terms of distortion, to the signal that would be received if precoding did not take place in the transmitter, the coefficient parameter values corresponding to the changed state of the channel can be formed using the same known methods as when adjusting the DFE's coefficient parameter values.

The invention is based on creating a situation in the receiver, in Tomlinson-Harashima precoded transmission, which corresponds in terms of equalizer adjustment, to non-precoded data transmission, in relation to channel distortion. Coefficient parameter values corresponding to the changed state of the channel can then be formed using suitable known methods for non-precoded data transmission. The reconstruction of the transmitted data is naturally carried out using a signal in which the effect of the precoder transfer function is not compensated.

Considerable advantages are gained with the aid of the invention.

The invention makes it possible for the precoder to be able to adapt continuously, even during data transmission, to changes in noise conditions taking place in the channel 2 and also to the drift arising from temperature variations in the analog filters and other phenomena.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
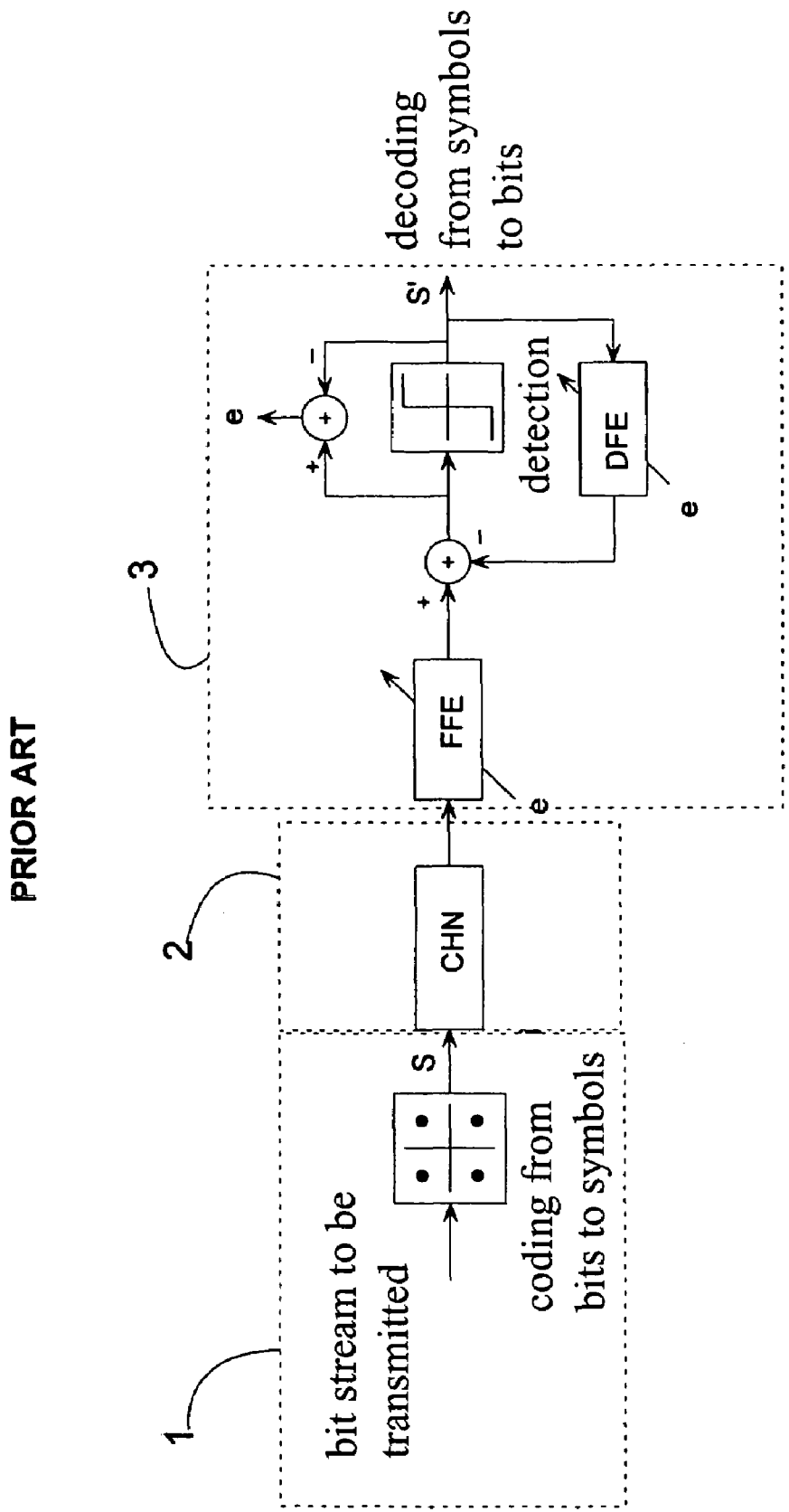
FIG. 1 shows a schematic diagram of one system according to the prior art for performing channel equalization.
Figure 2:
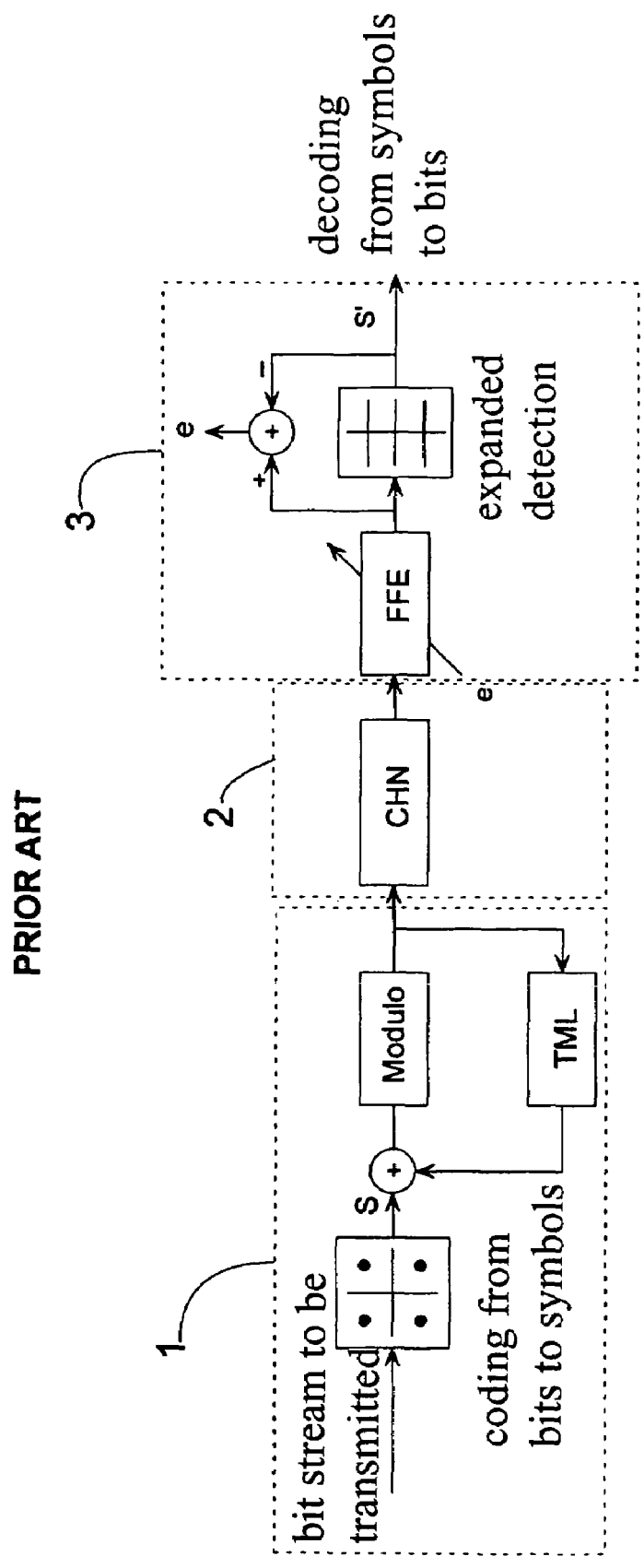
FIG. 2 shows a schematic diagram of a second system according to the prior art for performing channel equalization.
Figure 3:
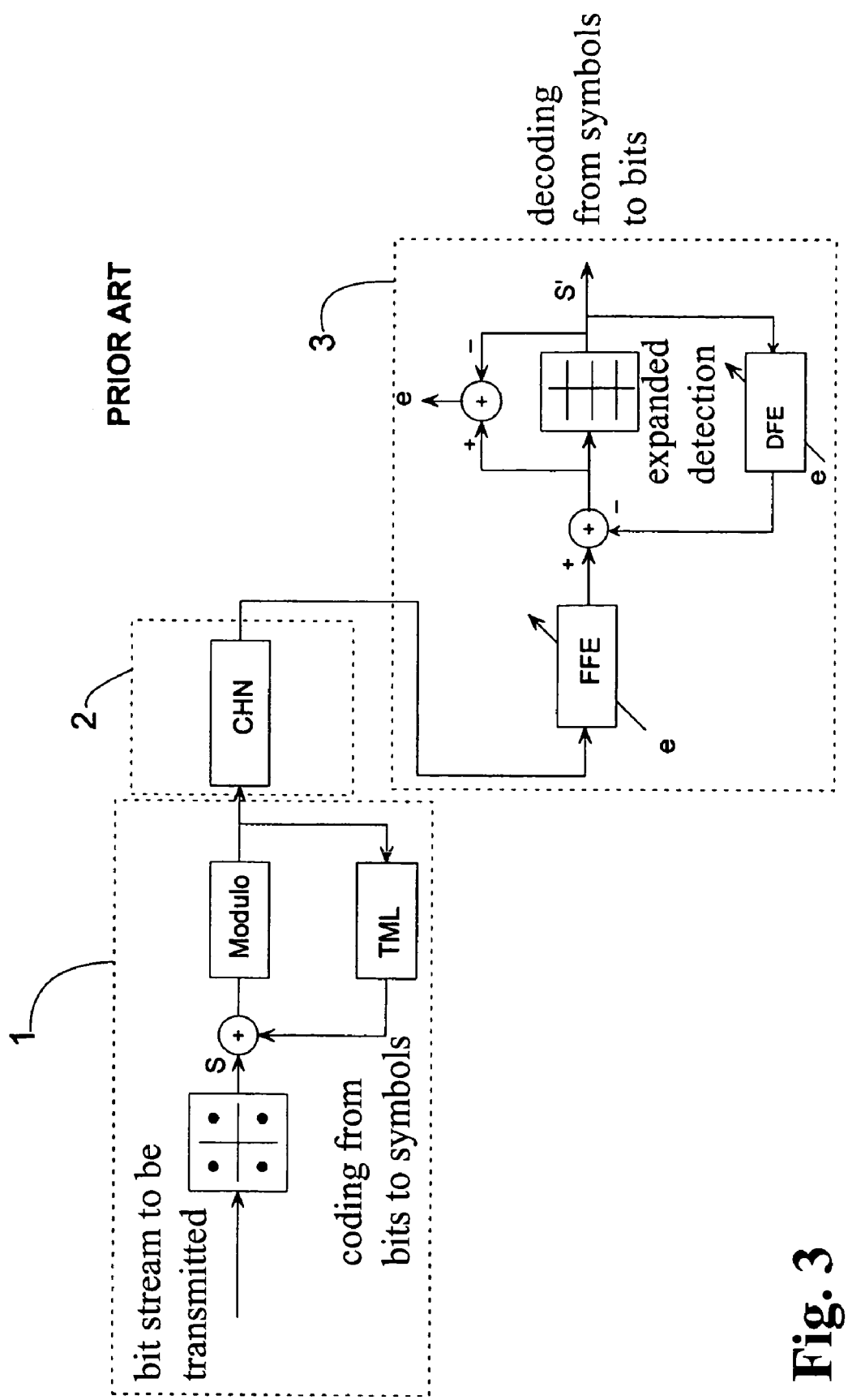
FIG. 3 shows a schematic diagram of a third system according to the prior art for performing channel equalization.
Figure 4:
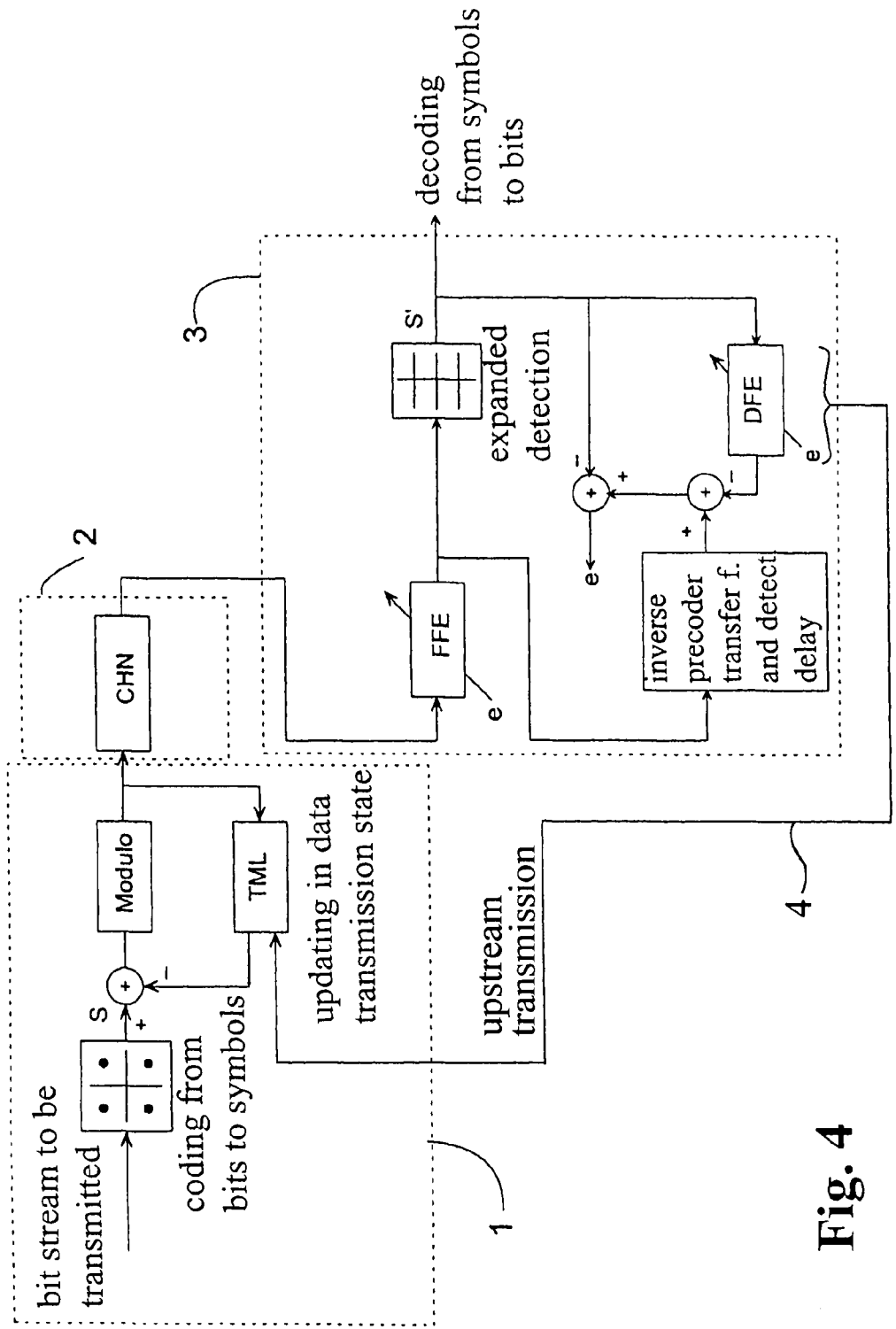
FIG. 4 shows a schematic diagram of a system according to the invention.

The invention relates to a method and apparatus, by means of which it is possible to implement a data transmission system, in which coefficient parameter values, corresponding to a changed state in the channel, can be formed for a Tomlinson-Harashima precoder, FIG. 4. The following analysis states the theoretical basis of the method.

Figure 5:
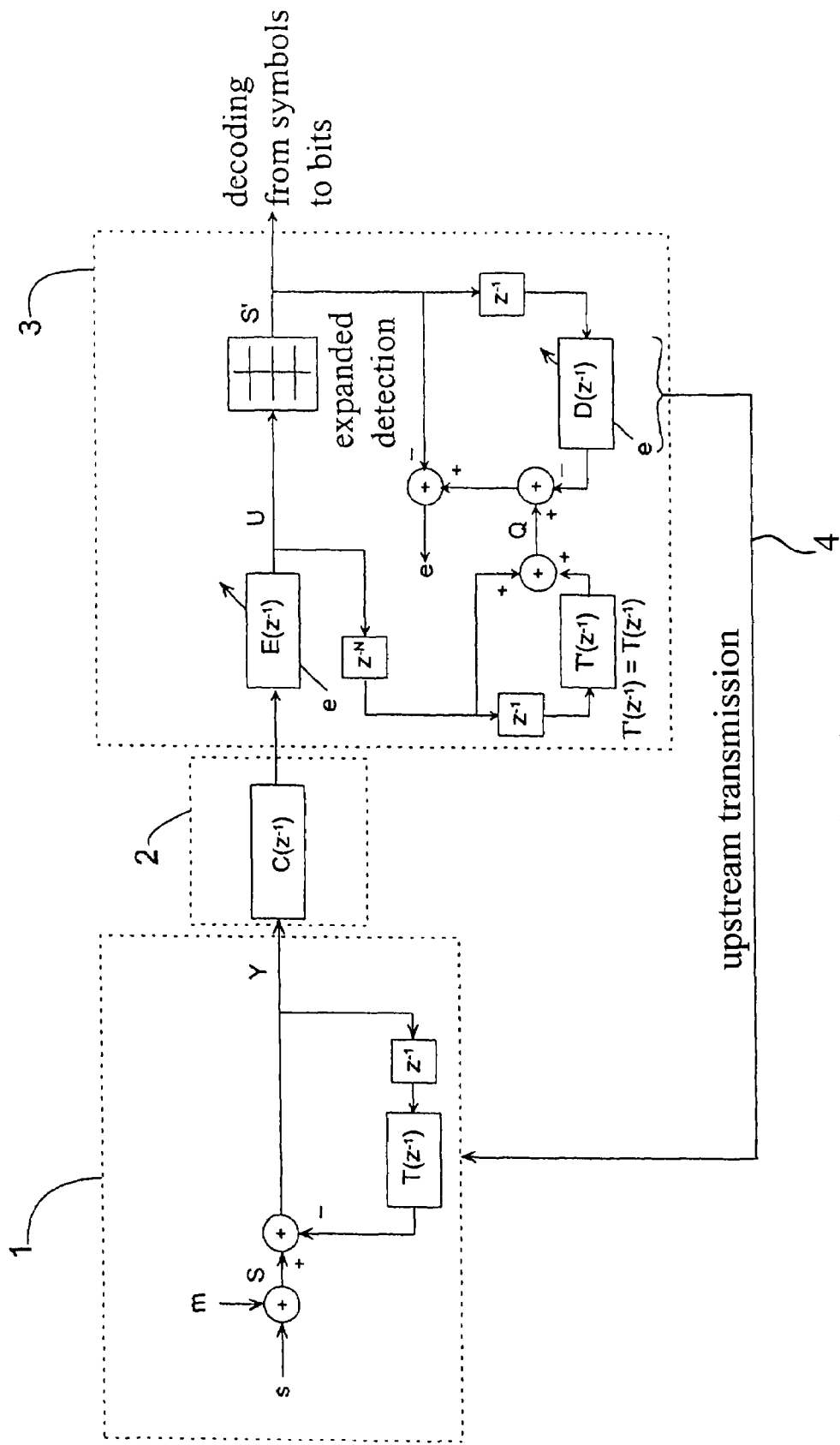
FIG. 5 shows a more detailed schematic diagram of the system according to the invention and its mathematical model.

FIG. 5 shows a discrete-time model of the system according to the invention, on the z-plane, in which $z^{-1}$ represents a delay in the duration of the symbol interval. The result of the modulo operation forming part of the precoding is included in the transmitted symbol. Basic information on Tomlinson-Harashima precoding is available, for instance, from the source (Lee & Messerschmitt).

Notations:

$C(z^{-1})$ transmission function of the channel 2 (includes fixed filters, modulation mechanisms, etc.)

$E(z^{-1})$ transfer function of the linear equalizer filter

U output of the linear equalizer

S symbol of the transmitted extended geometry=symbol (s) of the original geometry+modulo operation symbol (m)

S' symbol decision in the receiver of the extended geometry corresponding to the above e error variable of the decision S', used to adjust the equalizer $T(z^{-1})$ transfer function of the filter of the Tomlinson-Harashima precoder $T'(z^{-1})$ transfer function ($=T(z^{-1})$), used to form the inverse precoder transfer function in the receiver Y precoder output Q signal, from which the precoder transfer function effect has been removed $D(z^{-1})$ transfer function of the decision-feedback equalizer filter $z^{-N}$ detection delay The precoder transfer function is obtained with the aid of FIG. 5:

$$\frac{Y}{S} = \frac{1}{1+z^{-1}T(z^{-1})}.$$

The inverse precoder transfer function is then $1+z^{-1}T(z^{-1})$, which can be implemented as shown in FIG. 5, so that $T'(z^{-1})=T(z^{-1})$. The signal Q is obtained with the aid of FIG. 5

$$Q = S \times \left[ \frac{1}{1+z^{-1}T(z^{-1})} \times C(z^{-1}) \times E(z^{-1}) \times z^{-N} \times [1+z^{-1}T'(z^{-1})] \right],$$

because $T'(z^{-1})=T^{-1})$, $Q=S \times C(z^{-1}) \times E(z^{-1}) \times z^{-N}$ is obtained, from which it can be seen that there is no precoder transfer function effect in the signal Q. Thus, with the aid of the signal Q, the symbol decision S', and the output of the decision-feedback equalizer, it is possible to form the error variable e, with the aid of which both the linear equalizer and the decision-feedback equalizer can be adjusted in the same way (e.g. using the LMS algorithm) as in a case in which precoding is not performed in the transmitter.

The precoder is updated by copying the coefficient parameter values of the decision-feedback equalizer in the precoder and in the filter forming the inverse precoder transfer function:

$D(z^{-1}) \rightarrow T(z^{-1})$ and $D(z^{-1}) \rightarrow T'(z^{-1})$.

The precoder can also be updated by first of all calculating the coefficient parameter change values $\Delta T(z^{-1})=D(z^{-1})-T'(z^{-1})$, which are transferred to the transmitter using upstream transmission and added to the old precoder coefficient parameter values $T_{new}(z^{-1})=T_{old}(z^{-1})+T(z^{-1})$. The change values can be formed in the receiver, because in the method according to the invention, the precoder coefficient parameter values are always known in the receiver too, as $T'(z^{-1})=T(z^{-1})$.

A criterion for deciding when to update the precoder can be created, for example, as follows: the precoder is always updated when the absolute value of the change value of one or more coefficient parameter reaches a specific proportion (e.g., 1%) of the absolute value of the corresponding parameter. A second alternative is to update the precoder at specific fixed intervals (e.g., 10-s intervals).

However, it is preferable to reconstruct the transmitted data with the aid of a signal, from which the effect of the precoder transfer function has not been removed. For example, in the system shown in FIG. 5, the inverse precoder transfer function and the decision-feedback equalizer participate only in the signal processing relating to the adjustment of the equalizers, and not in the reconstruction of data.

Systems according to the invention may differ from each other in relation to the linear equalizer, which in some cases may also be fixed. Further, systems according to the invention may differ from each other in relation to their signal processing means, which are used to reconstruct the transmitted data in the receiver. The characteristic feature of systems according to the invention is that a signal is formed in the receiver, the effect of the precoder transfer function on which signal is compensated, and the information contained in the signal is used to update the precoder in steady state transmission.

REFERENCE

[Lee & Messerschmitt] E. A. Lee and D. G. Messerschmitt, *Digital Communication*, Kluwer Academic Publishers 1994.

The invention claimed is:

1. A method for implementing adaptive Tomlinson-Harashima precoding using a digital data communications link, the method comprising:
   coding outgoing bit stream into symbols in a transmitter (1),
   correcting channel distortion by preceding the symbols in the transmitter (1), using Tomlinson-Harashima precoding employing coefficient parameter values,
   sending the precoded symbols over a data communications channel (2, CHN) to a receiver (3), in which the symbols, which have passed through the signal processing means of the channel (2, CHN) and the receiver (3), are reconstructable to form a bit stream,
   wherein
   at least one set of new coefficient parameter values are formed for the precoder (TML) with the aid of an error variable (e), which is formed using the symbol decisions (S') of the receiver (3) and a signal (Q) that is obtained by compensating the effect of the precoder transfer function from the received signal with an inverse precoder transfer function.

2. The method according to claim 1, further comprising the step of forming the new coefficient parameter values in the receiver (3) and transmitting the new coefficient parameter values to the precoder of the transmitter (1) with the aid of an upstream transmission in a data communications link.

3. The method according to claim 1, further comprising the steps of:
   forming change values of the coefficient parameter values in the receiver (3) with the aid of the error variable (e),
   transmitting the change values from the receiver (3) to the transmitter (1) with the aid of upstream transmission in a data communications link, and
   forming new coefficient parameter values in the transmitter (1) with the aid of the change values received from the receiver (3) and of the existing coefficient parameter values.

4. An apparatus for implementing adaptive Tomlinson-Harashima precoding over a digital data communications link, the apparatus comprising:
   a transmitter (1), which, in turn, includes
      means for converting the bit stream into symbols, and
      a precoder (TML) for precoding the symbols,
   a transmission channel (2, CHN), through which the precoded symbols are transmitted, and
   a receiver (3) with signal processing means, with the aid of which the symbols passing over the channel (2, CHN) are reconstructed into a bit stream,
   the apparatus further comprising:
   means for forming an inverse precoder transfer function,
   means for forming an error variable (e), which is dependent on the symbol decisions (S') of the receiver and on a signal (Q) that is formed from the received signal by compensating the effect of the precoder transfer function with the aid of the inverse precoder transfer function, and means for forming new coefficient parameter values for the precoder, using the error variable (e).

5. The apparatus according to claim 4, wherein the apparatus includes means for transferring the precoder's new coefficient parameter values to an opposite end of the data communications link.

6. The apparatus according to claim 4, wherein the apparatus includes means for forming change values of the precoder coefficient parameters and means for transferring the said change values to an opposite end of the data communications link.

7. The receiver (3) for implementing adaptive Tomlinson-Harashima precoding in a method according to claim 1 over a digital data communications link, the receiver (3) comprising:

means for converting symbols into a bit stream, wherein the receiver (3) includes means for forming an inverse precoder transfer function, means for forming an error variable (e) that is dependent on the symbol decisions (S') of the receiver and a signal (Q) that is formed from a received signal by compensating an effect of the precoder transfer function using an inverse precoder transfer function, and means for forming new coefficient parameter values for the precoder (TML) located at the opposite end of the link, with the aid of the said error variable (e).

8. The receiver according to claim 7, wherein the receiver includes means for forming change values of the precoder's coefficient parameters.

* * * * *